June 20, 1939.  A. H. REIBER  2,162,790

PRINTING TELEGRAPH APPARATUS

Filed Nov. 13, 1936  2 Sheets-Sheet 1

INVENTOR
ALBERT H. REIBER
BY *J. H. B. Whitfield*
ATTORNEY

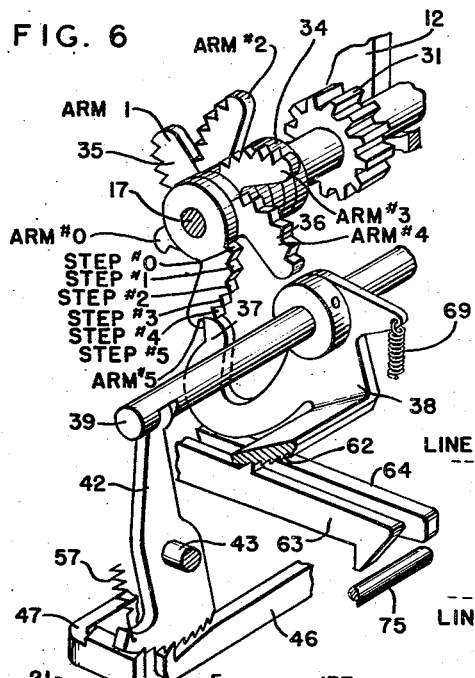
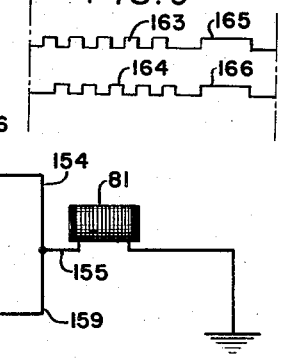
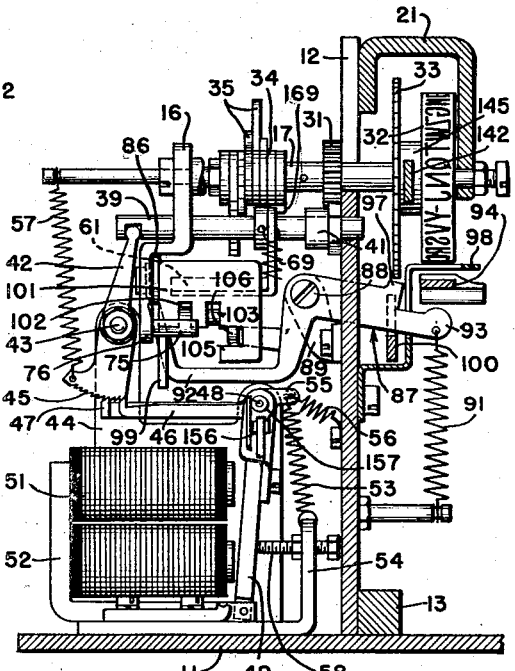

Patented June 20, 1939

2,162,790

UNITED STATES PATENT OFFICE 2,162,790

PRINTING TELEGRAPH APPARATUS

Albert H. Reiber, Evanston, Ill., assignor to Teletype Corporation, Chicago, Ill., a corporation of Delaware Application November 13, 1936, Serial No. 110,722

43 Claims. (Cl. 178—34)

The present invention pertains to printing telegraph apparatus and more particularly to printing telegraph receiving apparatus wherein characters are printed upon a tape.

The principal object of the invention is to provide a printing telegraph machine wherein the functions are performed in a reliable and efficient manner by mechanism which is simple and economical to manufacture.

According to the present invention, the printing apparatus operates on a two wire system in which one line wire is connected through one ratchet magnet to a winding of a printing magnet, and the other line wire is connected through a second ratchet magnet to a second winding of the printing magnet, which windings are connected to ground. Character printing is effected only when both windings of the printing magnet are energized. Each character signal consists of two parts; namely, stepping impulses and a prolonged printing impulse both of which occur concurrently on both line wires. For example, the stepping impulses occurring on one line wire control the stepping of a type wheel one-sixth of a revolution per impulse, and the stepping impulses occurring on the second line wire control the stepping of the type wheel one-thirty-sixth of a revolution per pulse. These positioning impulses exist on both line wires simultaneously, but the impulses on one line are staggered with respect to the impulses on the other line so as not to energize the print magnet prematurely. The maximum number of impulses on either line necessary to step the type wheel to any one of its thirty-six positions from its zero position is five. The second part of the character signal consists of a prolonged impulse occurring on both lines simultaneously and functions to operate the printing magnet which also acts to restore the type wheel and selecting mechanism to normal or starting position.

The selecting mechanism of the printer consists of a rotatable cylindrical part arranged in axial alignment with the type wheel shaft and provided with a helical series of curved arms each provided with a number of steps. These arms cooperate with a coordinately positionable stop arm to determine the character to be printed. Hence, the selection of the character is determined by the application of the principle of coordinates; that is, the stop is movable under the control of one of the line magnets in one direction and in another direction under the control of the other line magnet so that the movement of the stop in either direction, predetermined by the number of stepping impulses on each line required, establishes a stopping position for the rotatable cylindrical part which constantly tends to rotate unless stopped by the coordinately positionable stop.

The above and other objects of the invention will be apparent from the following description when taken in conjunction with the accompanying drawings, wherein like reference characters designate similar parts throughout the several views, and in which, Fig. 1 is a rear elevational view of the printer according to the present invention illustrating the arrangement of the component parts;

Fig. 4 is a partial front elevational view of the printer according to the present invention;

Fig. 5 is a cross-sectional view taken substantially on line 5—5 of Fig. 4;

Fig. 6 is an enlarged perspective view of the selecting mechanism;

Fig. 7 is a diagrammatic representation of the coordinate positions of the character selecting pointer;

Fig. 8 is an electrical diagram for the receiving apparatus, and

Fig. 9 is a graphic representation of the form of signal employed by the present invention.

Figure 2:
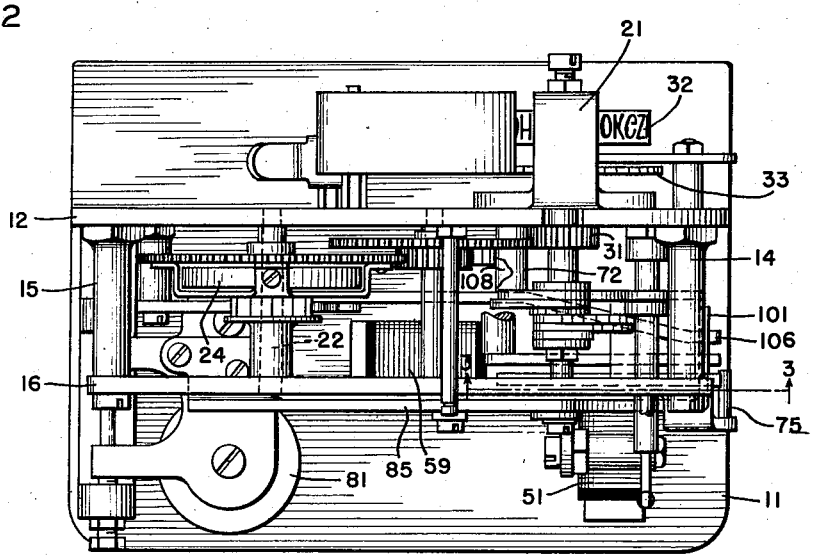
Fig. 2 is a plan view of the printer shown in Fig. 1.

Having reference to Figs. 1 to 5, the framework of the printing apparatus according to the present invention comprises a base plate 11 supporting a mounting plate 12 through the instrumentality of a bar 13 (Fig. 5). A pair of posts 14 and 15 fixed to the mounting plate 12 support a bar 16 which provides a journal bearing for shafts 17, 18, and 19. Shaft 17 is journalled at its end remote from bar 16 in a bracket 21 (Fig. 5) which is fixed to mounting plate 12. Shafts 18 and 19 are journalled at their ends remote from bar 16 in the mounting plate 12.

Shaft 19 supports a sleeve 22 which carries integral therewith a ratchet 23. To sleeve 22 is riveted one end of a flat spiral spring 24, the other end of which is riveted to a cage member 25 which is fixed to a gear 26 in such manner as to form a cage or enclosure for spring 24. Thus, when ratchet 23 is rotated in a counterclockwise direction by a pawl 27, in a manner which will hereinafter become apparent, it tends to wind up spring 24, which under certain predetermined conditions, will cause gear 26 to rotate in a similar direction. Gear 26 meshes with a pinion 28 which is carried on shaft 18 and fixed to a gear 29, and which in turn meshes with a pinion 31 (Fig. 2) fixed to shaft 17.

Also secured to shaft 17, between bracket 21 and mounting plate 12, is a type wheel 32 (Figs. 2 and 5) which has associated therewith and fixedly connected thereto a multi-toothed or star wheel 33. Fixed to shaft 17 intermediate mounting plate 12 and the bar 16 is a cylindrical member 34 having a helical series of curved arms 35. Although, according to the present embodiment, each one of the curved arms 35 is provided with an integral hub portion and is mounted on shaft 17, and the several arms are arranged in laminated manner, it is understood that an integral cylindrical portion or part 34 may be provided having the helical series of curved arms 35 arranged thereon. Each one of the arms 35 is provided on its convex surface with a plurality of serrations or steps 36 which cooperate or coact with the extremity of a selecting finger or stop member 37 to provide a stop for arresting the rotation of the cylinder 34 at various positions depending upon the particular coordinate position of the extremity of stop member 37, as will be presently described.

Figure 1:
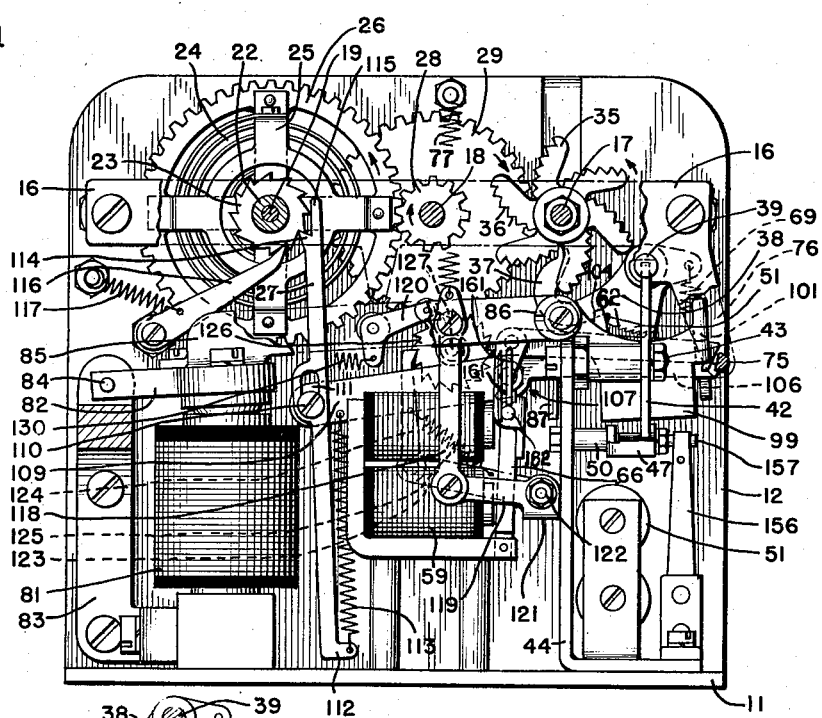
Figure 3:
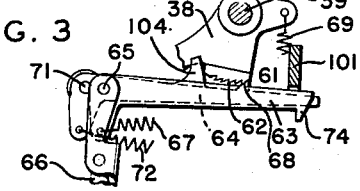
Fig. 3 is a fragmental cross-sectional view taken substantially on line 3—3 of Fig. 2.

From the description of the apparatus so far, it is observed from Fig. 1 that spring 24, after it has had sufficient power stored therein by the action of pawl 27 on ratchet 23, constantly tends to rotate gear 26 in a counterclockwise direction, imparting through pinion 18 and gear 29, counterclockwise rotation to gear 31, and hence to cylinder 34. Cylinder 34 thus constantly tends to rotate in a counterclockwise direction unless stopped by the coaction of one of its arms 35 with stop member 37.

Selecting finger or stop member 37 is adapted to assume any one of the thirty-six coordinate positions symbolically represented in Fig. 7 in the followng manner: Member 37 is integral with a member 38 affixed to a shaft 39 which is slidable axially in its bearings in journal plate 16 and mounting plate 12 (Fig. 5). To increase its bearing support in plate 12, a collar 41 is provided which is fixed to plate 12, thus augmenting the bearing support for the slidng motion of shaft 39. The left end of shaft 39 is pivotally articulated to the vertical arm of a lever 42, as shown in Fig. 5. Lever 42 is pivotally carried at 43 on a bracket 44 mounted on base plate 11. The arcuate edge of the depending arm of lever 42 is provided with a plurality of ratchet teeth 45 which coact with an operating pawl 46 and a detent 47. Pawl 46 is pivoted at 48 to the armature 49 of a magnet 51 carried on bracket 52 mounted on base plate 11, and is constantly urged into engagement with teeth 45 by a spring 53 distended between a bracket 54 mounted on base plate 11 and an arm 55 of pawl 46. Also distended between arm 55 and mounting plate 12 is a spring 56 which functions as a retractile spring for armature 49. Detent pawl 47 is pivotally mounted at 50 (Fig. 1) to bracket 44 and is provided with a spring (not shown), similar to spring 53, which biases pawl 47 into engagement with teeth 45.

Lever 42 is constantly biased in a clockwise direction by a spring 57. When magnet 51 is energized by one of the stepping impulses, it pulls up its armature 49 against the tension of spring 56 thus advancing pawl 46 toward the left (as viewed in Fig. 5) to engage the next tooth in the series of teeth 45. Upon deenergization of magnet 51 at the termination of a stepping impulse, the armature 49 is retracted by its spring 56 against its adjustable stop screw 58. Pawl 46, as a result thereof, is urged rightwardly causing lever 42 to rotate a predetermined angular amount against the action of its spring 57 which is less powerful than spring 56 to cause, in turn, shaft 39 to slide axially toward the left an amount corresponding to the distance between one arm 35 and the next arm 35. After lever 42 has been moved a unit angular amount by pawl 46, it is held thereat by detent 47. Likewise, the receipt of each stepping impulse directed to magnet 51 will cause lever 42 to rotate corresponding angular amounts imparting in turn to shaft 39 corresponding axial movements so that upon the receipt of each succeeding impulse, stop member 37 will be moved from the plane of one arm 35 to the next one and so on through the successive series of stepping impulses. In this manner transitional movement is imparted to member 38, and hence to stop member 37.

The clockwise rotation of member 38, carrying member 37, in a step-by-step manner is controlled by electromagnet 59 (Fig. 1) which responds to stepping impulses over a second line wire. To achieve this result, member 38 is provided with a portion 61 which is provided on its outer arcuate surface with a plurality of elongated parallel ridges 62 which simulate ratchet teeth. Cooperating with teeth 62 are a pawl 63 and a detent member 64. Pawl 63 is pivotally connected at 65 to armature 66 of the electro-magnet 59 and is normally biased into engagement with teeth 62 by a spring 67.

When magnet 59 is energized upon the receipt of a stepping impulse, armature 66 will be pulled against the action of spring 67 (Fig. 3) causing the tooth 68 of pawl 63 to be moved to the left an amount equivalent to one tooth. Upon the rightward movement of pawl 63, the beveled end 74 thereof strikes against a fixed cam member 75 so that pawl 63 is constrained in its engagement with teeth 62. The location of cam 75 is so fixed as to govern the exact movement of pawl 63 and hence, the member 38. Cam 75 may, if desired, be carried by an adjustable arm mounted on the bar 16. As indicated in Figs. 2 and 5, however, cam projection 75 is shown as fixed to the arm 76 which is shown as integral with bar 16. Upon deenergization of magnet 59 at the termination of a stepping impulse, armature 66 will be released and spring 67 will urge armature 66 and pawl 63 rightwardly (Fig. 3), causing tooth 68 to rotate member 38 in a counterclockwise direction about shaft 39 a unit angular amount. Each repetition of the action of magnet 59 in response to successive stepping impulses will cause member 38, and hence stop member 37, to rotate corresponding unit angular amounts against the action of spring 69. Each time member 38 is moved an angular amount, it is held thereat by the latching pawl 64 which is pivoted at 71 to post 72 (Fig. 3) carried on mounting plate 12. Detent 64 is normally urged into engagement with teeth 62 by its spring 73.

When the printing impulse is received, a printing magnet 81, Fig. 1, becomes energized and causes its armature 82 to be pulled up. Armature 82 is suitably mounted on a bracket 83, secured to mounting plate 12, to which armature 82 is pivoted at 84. Fixed to armature 82 is an operating arm 85 which carries near its outer extremity an eccentric adjusting screw 86 which cooperates with a printing lever 87 (Figs. 1 and 5). As indicated more clearly in Fig. 5, the printing lever 87 is pivotally supported at 88 to a bracket 89 fixed to the mounting plate 12. Printing lever 87 is normally biased to its clockwise position by a spring 91.

Arm 92 of printing lever 87 is conformed in a U-shaped manner, as viewed in Fig. 5, between pivot 88 and adjusting screw 86 so as to avoid intervening mechanism. Thus, when printing magnet 81 is energized, the downward movement of the eccentric screw 86, caused by the operation of arm 85, will impart counterclockwise rotation to printing lever 87 against the action of its return spring 91. The impact of extremity 93 of lever 87 with a platen 94 causes the platen 94 to be thrown sharply upwardly against the character on type wheel 32 which has been selectively positioned for recordation. Platen 94 is carried at the extremity of a lever 95 (Fig. 4) pivoted on a stud 96, carried in mounting plate 12 and is gravitated back to its unoperated position so that when it is struck a sharp impact by extremity 93 of printing lever 87, it is free to bound against the type wheel 32 to produce printing, the printing lever 87 being returned immediately by its spring 91 upon deenergization of printing magnet 81, a retractile spring 77 acting to return operating arm 85 to its upward position. Adjacent the extremity of printing lever 87 is a stabber portion 97 which coacts with the star wheel 33 to properly align the type wheel 32 during the printing operation. In addition to the function of thus properly aligning the type wheel 32, the stabber 97, due to the particular structural relationship between the star wheel 33 and stabber 97, acts to hold the type wheel shaft, and hence cylinder 34, momentarily until member 37 has returned to its normal zero position in readiness for a succeeding positioning. To achieve this time delay the teeth on the star wheel are made deeper, so that the complete withdrawal of stabber 97 from the teeth will not be attained until the member 37 has been fully returned to its zero position. A yieldable guard 98 is mounted between platen 94 and type wheel 32 to prevent fringe printing of adjacent characters. The vertical movement of lever 87 is guided by a guide bracket 100 secured to mounting plate 12.

Operating arm 85 is provided at its extremity beyond the eccentric screw 86 with means for effecting the restoration of the selecting elements 34 and 38 to normal, and to provide motion to the pawl 27 to wind up the spring 24. The means provided comprises an extension 99, Figs. 1 and 5, which acts when arm 85 is operated downwardly by magnet 81, to disengage pawl 46 and detent 47 from teeth 45 permitting spring 57 (Fig. 5) to restore, through lever 42, shaft 39 to its rightward position. The aforementioned means carried at the extremity of operating arm 85 also comprises a laterally disposed portion 101 (Fig. 5) which is provided with notches 102 and 103 adapted to receive the ends of pawl 63 and detent 64, respectively, so that, when portion 101 is actuated downwardly, upon the operation of magnet 81, it functions to disengage pawl 63 and detent 64 simultaneously from the teeth 62, permitting member 38 to respond to the pull of its biasing spring 69 to rotate clockwise until portion 61 is arrested by a stop projection 104 integral with detent 64.

End portion 101 is further provided with a horizontal notch 105 which receives the extremity of arm 106 of a lever 107 pivotally mounted at 108 upon a stud which extends from the mounting plate 12. Lever 107 also has an arm 109 which carries at its extremity a shoulder screw 110 which is adapted to reside in a slot 111 in pawl member 27. Distended between arm 109 of lever 107 and end 112 of pawl 27 is a spring 113 which tends to urge pawl 27 upwardly to bring the lower end of slot 111 into contact with stud 110. The function of spring 113 is to provide a yield between pawl 27 and arm 109 in the event that the spring 24 is already tightly wound, so as to prevent jamming. Pawl 27 is provided at its upper extremity beyond tooth 114 with guide projection 115. Thus, upon actuation of the operating arm 85 downwardly by magnet 81, the end portion 101 of arm 85 will, through notch 105 and end 106, cause lever 107 to rotate in a clockwise direction about its pivot 108, thus, through spring 113, causing pawl 27 to move upwardly to impart rotation to ratchet 23, which in turn will wind the spring 24, storing energy therein. A detent pawl 116 biased by a spring 117 is provided to prevent the unwinding of spring 24, except under the control of the stop member 37. In this manner, sufficient energy is restored in spring 24, upon each operation of the printing magnet 81, to compensate for the energy expended in rotating the type wheel shaft 17 during each character selection.

Pivotally connected to operating arm 85 in the proximity of eccentric screw 86 is a link 118 depending therefrom, to the lower extremity of which is pivotally connected arm 119 of a tape feed bail lever 121 pivotally carried on a stud 122 screwed to mounting plate 12. Bail 121 is also provided with an arm 123 which carries at its extremity a tape feed pawl 124. Pawl 124 by a spring 125 is normally biased in a clockwise direction (Fig. 1) into engagement with a tape feed ratchet wheel 126 pivoted on shaft 127, Figs. 1 and 4, suitably supported in mounting plate 12. A detent 120 is provided for ratchet wheel 126, biased by a spring 130. Carried on shaft 127 on the side of mounting plate 12, opposite to that on which ratchet 126 is carried, is a flanged tape feed roller 128. Cooperating with tape feed roller 128 is a pressure roller 129 carried on a lever 131 provided with a finger piece 132 for manual release of pressure. Pressure is imparted by roller 129 against feed roller 128 due to the biasing action of a spring 133 upon lever 131. As viewed in Fig. 4, a tape 134 is directed from a source (not shown) around a guide roller 135, over the feed roller 128, through the printing region, thence over the member 95 which is provided at its hub portion with guide flanges 136. An inking roller 137 is carried on the end of a lever 138, pivoted at 139 to mounting plate 12. The inking roller 137 is normally tensioned against type wheel 32 by a spring 141 upon lever 138.

A feature of the invention consists in providing a braking means for the type wheel 32 to prevent back slipping. As shown in Fig. 4, the braking means comprises a lever 142 pivoted at 143 to the mounting plate 12. A spring 144 normally tends to urge lever 142 in a clockwise direction so as to hold the outer edge 146 of lever 142 against the hub 145 of type wheel 32. In this manner, as type wheel 32 rotates during its selective operation in a clockwise direction, it tends to urge lever 142 counterclockwise against the action of spring 144. However, when the selection has been made, any tendency of type wheel 32 to rebound is prevented by the toggling action between hub 145 and edge 146 of lever 142 caused by the frictional engagement between hub 145 and edge 146.

Referring now to Fig. 8, the terminals 151 and 152 are connected to wires No. 1 and No. 2, respectively, of the signal line. Thus, the signalling impulses transmitted over line No. 1 are conducted through terminal 151, over conductor 153, through winding of magnet 51, over conductors 154 and 155, through the winding of print magnet 81, thence to ground. Introduced in the circuit just described is a contact 156, connected to ground, controlled by the magnet 51. The contact 156 is shown in Figs. 1 and 5, and is controlled by an insulated stud 157 carried on armature 49. The function of this contact is to short circuit the printing magnet 81 during the reception of stepping impulses over line 152.

Similarly, the impulses transmitted over line wire No. 2 are received through terminal 152, thence over conductor 158, through winding of magnet 59, thence over conductors 159 and 155, through the winding of print magnet 81, to ground. There is also introduced in the circuit just described, a contact 161, connected to ground, which is controlled by magnet 59. Contact 161 is shown in Fig. 1 as controlled by an insulated stud 162 carried on armature 66. The function of contact 161 is similar to 156, which is to short circuit the magnet 81 during the reception of stepping impulses over line 151. When it is recalled, as shown in Fig. 9, that the stepping impulses (indicated 163 and 164) of lines Nos. 1 and 2 are staggered, the function of contacts 156 and 161 will be apparent. For example, when a stepping impulse is received by magnet 51, its armature 49 will be attracted to cause contact 156 to open, thus causing the current impulse to pass over conductors 154 and 159, through contact 161, to ground, and not through the winding of magnet 81. In a similar manner, a stepping impulse received by magnet 59 will cause the attraction of armature 66, and thus open contact 161, directing the impulse over conductors 159 and 154, through contact 156, to ground, short circuiting the magnet 81. The prolonged printing impulses 165 and 166 (Fig. 9) are received simultaneously over the two line wires, and magnets 51 and 59 are operated simultaneously, opening both contacts 156 and 161, thus preventing the short circuiting of magnet 81 and causing the current over both lines to pass over conductor 155, through winding of printing magnet 81 to ground.

*General operation*

Preparatory to message reception, the stop member or selecting finger 37 must be at its zero or normal stop position wherein the type wheel 32 is arrested in its "blank" position; that is, with the blank portion of the type wheel opposite the printing platen 94. Each square of the diagram shown in Fig. 7 corresponds to a particular character on the type wheel 32. The normal stop position of the member 37 is that position indicated in dotted outline 167, shown in Fig. 7, wherein the pointer assumes a position represented by the upper right-hand square of the diagram 168. In this position, the tip of member 37 coacts with that step 36 closest to the axis of shaft 17 on that curved arm 35 nearest to mounting plate 12. For purposes of this description, the step 36 in each arm 35 closest to the axis of shaft 17, as indicated in Fig. 6, will be designated as step No. 0, and the other steps 36 in the order of their distance from the axis of shaft 17 will be designated steps Nos. 1, 2, 3, 4, and 5. Likewise, the curved arm 35 nearest to the mounting plate 12 will be designated as arm No. 0, and correspondingly, the arms with respect to their distance from mounting plate 12 will be designated arms Nos. 1, 2, 3, 4, and 5.

The member 37 is indicated in Fig. 6 as engaging step No. 5 on arm No. 5 which corresponds to the position it is shown in solid lines in Fig. 7. Assuming that the member 37 is in the dotted position 167 of Fig. 7, which is the normal zero position (or that position shown in Figs. 1 and 5), and five stepping impulses are transmitted over the line wire connected to terminal 152 (Fig. 8), magnet 59 will be actuated five times to cause pawl 63 to actuate member 38 five angular steps to bring member 37 to that position indicated 0—5 in Fig. 7 which signifies that the pointer is opposite the sixth step (step No. 5) of arm No. 0. As another example, assume that five stepping impulses are received over the line wire connected to terminal 151 (Fig. 8) and none over the other line wire. The magnet 51 will be actuated five times so as to cause pawl 46 to move lever 42 five angular steps, moving through shaft 39 the member 37 in position with arm No. 5. In this condition, the motor spring 24 will rotate the cylinder 34 until step No. 0 of arm No. 5 coacts with the tip of member 37, which is that position corresponding to square 5—0 in Fig. 7, which signifies that the pointer is positioned to coact with step No. 0 of arm No. 5. Each one of the hyphenated numeral designations in Fig. 7 indicates the arm and step to which the square in the diagram corresponds, the arm being indicated first and the step last.

As a further example, assume that four stepping impulses are received over the line wire connected to terminal 152, and five stepping impulses are received over line wire connected to terminal 151. In response to this signal, the magnet 59 will be operated four successive times, which will cause pawl 63 to move member 38, and hence stop member 37 will move through four angular positions, which corresponds to the fifth horizontal row from the top in Fig. 7. Now, the five impulses received through terminal 151 will cause pawl 46 to operate lever 42, through five angular steps causing, through shaft 39, member 38, and hence member 37 to move to a point corresponding to the sixth vertical row from the right in Fig. 7. In response to this signal, the tip of member 37 should assume a position corresponding to the square indicated 5—4 in Fig. 7, which indicates a position representative of the step No. 4 on arm No. 5. From the foregoing, it will be apparent that the selecting mechanism of the present invention operates on the coordinate principle, and that the impulses received by magnet 51 control the transitional movement of stop member 37 and the impulses received by magnet 59 control the rotational movement of stop member 37.

In actual operation, a constant torque is applied to the cylinder 34 by the power spring 24 and in whichever manner member 37 is moved, whether axially or circumferentially (that is, transitionally or rotationally), the member 37 will slide off a step with which it is in contact to assume a new position in space corresponding to the stepping impulse received, whereupon the cylinder 34 will immediately rotate until a new step on a new arm comes into contact with the new position of the member 37.

Moreover, when the prolonged printing impulse is received over both line wires, the operating arm 85 is operated to cause the actuation of printing arm 87 and simultaneously to effect the disengagement of pawls 46 and 63 and their associated detents 47 and 64 respectively, to permit member 37 to respond to the action of its return springs 57 and 69 to return member 37 to a position represented in dotted lines by the position 167 in Fig. 7 which corresponds to that position shown in Fig. 1.

To compensate for a condition of operation that exists in the embodiment of the invention illustrated, a ridge or stop 169 (Fig. 5) is provided adjacent step No. 0 of arm No. 0 which acts to hold the cylinder 34 at the zero stop position until the termination of the prolonged printing impulse. To illustrate, when the prolonged printing impulse is received all the magnets; namely, 51, 59, and 81, remain energized for the duration of the printing impulse. In this condition, the pawls 46 and 63, and detents 47 and 64, are held disengaged from teeth 45 and 62, respectively, permitting member 37 to be returned to its zero position, as previously described, by springs 57 and 69. However, member 37 is moved by spring 57 beyond arm No. 0 to engage projection 169 (Fig. 5). Therefore, to bring member 37 into its proper position in alignment with step No. 0 on arm No. 0, it is necessary to permit the engagement of pawl 46 with the first tooth of the plurality of teeth 45 before the armature 49 is released. To achieve this result, the magnets 59 and 81 are caused to become deenergized before magnet 51 by making the printing impulse on the line wire connected to terminal 152 slightly shorter. Thus, upon the release of armature 82 of printing magnet 81, and the consequent raising of operating arm 85, pawl 46 will be permitted to become engaged with a tooth on lever 42, while the magnet 51 is still energized. Then upon determination of the printing impulse on the line wire connected to terminal 151, and the consequent deenergization of magnet 51, the lever 42 will be rotated one angular step so as to bring member 37 into position with step No. 0 of arm No. 0. Another manner of achieving this result is to permit the member 37 to be returned to the position wherein it will engage ridge 169, and then prior to the transmission of a succeeding character signal, an initial impulse can be transmitted over the line wire connecting with terminal 151 (Fig. 8) to energize magnet 51 to move the member 37 into alignment with arm No. 0.

Upon the receipt of the prolonged printing impulse, the feeding pawl 124 is retracted so as to pick up the next tooth on the ratchet 126. Likewise, the power spring pawl 27 is retracted so as to pick up the next tooth on ratchet 23. Then upon the release of operating arm 85 under the action of spring 77, pawl 124 will rotate ratchet 126 one step to impart a movement of one character space to the tape, and the pawl 27 will rotate ratchet 23 one step to store further energy in the power spring 24.

Although the present invention has been disclosed in connection with a specific embodiment thereof, it is understood that such embodiment is merely illustrative and not restrictive, and that all forms coming within the scope of equivalency of the appended claims are intended to be covered by the invention.

What is claimed is:

1. In a selector, a rotatable shaft, a cylinder carried by said shaft having projections thereon, a reciprocable pawl, and means for moving said pawl longitudinally of the cylinder for determining the stop position of said shaft.

2. In a selector, a rotatable shaft, a cylinder carried by said shaft having a helical series of arms each provided with a number of steps, a reciprocable pawl, and means for moving said pawl longitudinally of the cylinder for determining the stop position of said shaft.

3. In a selector, a rotatable shaft, a cylinder provided with helically arranged projections cooperatively related to said shaft, a reciprocable pawl, and means for moving said pawl relatively to said projections for determining the rotatable positioning of said shaft.

4. In combination in a printing telegraph receiver, a dually controlled type wheel, electromagnetic means responsive to signal impulses for controlling the movement of said type wheel, means comprising a rotatable cylindrical member having a helical series of arms each provided with a number of steps, and a coordinately positionable stop member controlled by said electromagnetic means adapted to cooperate with said arms to determine the character to be printed.

5. In the operation of a type wheel printer, a method of actuating a type wheel to an ultimate position for printing which comprises applying a continuous torque to the type wheel, controlling the release of the type wheel for rotation intermittently through the instrumentality of a coordinately positionable stop member, and summating the angles of rotation of the type wheel at each release thereof.

6. In a selector, a rotatable shaft, a cylinder carried by said shaft having projections thereon, a pawl, and means for imparting rotational and translational movements to said pawl, whereby said pawl is adapted to cooperate with the projections on said cylinder to determine the stop position of said shaft.

7. In a selector, a rotatable shaft, a cylinder carried by said shaft having a helical series of arms each provided with a number of steps, a stop element, and means for imparting rotational and translational movements to said stop element, whereby said element is adapted to cooperate with said steps to determine the stop position of said shaft.

8. In a selector, a rotatable shaft, a cylinder carried by said shaft having projections thereon, a stop element, means for imparting rotational and translational movements to said stop element, and signal controlled means for operating said means to govern the ultimate stopping position of said shaft.

9. A method of actuating a type wheel printer which comprises applying a continuous torque to a type wheel, restraining the type wheel from rotating, controlling the release of the type wheel for rotation intermittently through the instrumentality of a coordinately positionable stop member, and summating the angles of rotation of the type wheel at each release thereof.

10. In a printing telegraph receiver, a member having a helical series of arms, each provided with a plurality of abutting surfaces, an escapement mechanism for controlling the rotation thereof, a motor driven shaft for rotating the type wheel, and a signal responsive selector mechanism for controlling the escapement mechanism.

11. In a printing telegraph receiver, a rotatable type wheel, a member having a helical series of arms for controlling the rotation thereof, a single stop element cooperable with said arms for controlling said member, and a signal responsive means for controlling said stop element.

12. In a printing telegraph receiver, a rotatable type wheel, a member having a helical series of arms for controlling the rotation thereof, a stop element, means for imparting rotational and translational movements to said element, whereby said element is rendered cooperable with said arms for controlling said member, and a signal responsive means for operating said means.

13. In a printing telegraph receiver, a rotatable type wheel, an escapement mechanism for controlling the rotation thereof, a first signal responsive means for controlling said escapement mechanism to effect the rotation of said type wheel through a single character step, and a second signal responsive means for controlling said escapement to effect the rotation of said type wheel through a predetermined plurality of character steps.

14. In combination in a printing telegraph receiver, a dually controlled type wheel, a first electromagnetic means responsive to signal impulses for controlling the movement of said type wheel in one manner, a second electromagnetic means responsive to signal impulses for controlling the movement of said type wheel in another manner, a third electromagnetic means for controlling the printing of the selected character, and means effective only when said first and second means are operated simultaneously to render said third means effective.

15. In a selector, a rotatable shaft, a cylinder carried by said shaft having projections thereon, a stop element cooperable with said projections and capable of rotational and translational movements, a first signal responsive means to effect the rotational movement of said element, and a second signal responsive means to effect the translational movement of said element to cooperate with said first signal responsive means to govern the ultimate positionment of said stop element to determine the stopping position of said shaft.

16. In a selector, a rotatable shaft arrestable in any one of a plurality of character stop positions, a cylinder carried by said shaft having projections thereon less in number than the available number of character stop positions, a reciprocable pawl for arresting said shaft, and means for moving said pawl longitudinally of the cylinder for determining the stop position of said shaft.

17. In a selector, a rotatable shaft arrestable in any one of a plurality of character stop positions, a cylinder carried by said shaft having a helical series of arms less in number than the number of character stop positions, each provided with a number of steps, a reciprocable pawl for arresting said shaft, and means for moving said pawl longitudinally of the cylinder for determining the stop position of said shaft.

18. In a selector, a rotatable shaft arrestable in any one of a plurality of character stop positions, a cylinder carried by said shaft having a helical series of arms less in number than the number of character stop positions, each provided with a number of steps, a coordinately positionable stop member for arresting said shaft, and means to cause said member to cooperate coordinately with said steps to determine the stop position of said shaft.

19. In a selector, a rotatable shaft arrestable in any one of a plurality of character stop positions, a cylinder carried by said shaft having projections thereon less in number than the number of character stop positions, a pawl for arresting said shaft, and means for imparting rotational and translational movements to said stop elements, whereby said pawl is adapted to cooperate with the projections on said cylinder to determine the stop position of said shaft.

20. In a selector, a rotatable shaft arrestable in any one of a plurality of character stop positions, a cylinder carried by said shaft having projections thereon less in number than the number of character stop positions, a stop element for arresting said shaft, means for imparting rotational and translational movements to said stop element, and signal controlled means for operating said means to govern the ultimate stopping position of said shaft.

21. In a selector, a rotatable shaft arrestable in any one of a plurality of character stop positions, a cylinder carried by said shaft having projections thereon less in number than the number of character stop positions, an escapement mechanism for controlling through the instrumentality of said projections the rotation of said cylinder to arrest said shaft, and a signal responsive selector mechanism for controlling the escapement mechanism to determine the stop position of said shaft.

22. In a printing telegraph receiver, a rotatable type wheel provided with a plurality of characters, a member having a series of arms less in number than the number of characters on said type wheel for controlling the rotation thereof, stop means cooperable with said arms for controlling said member, and a signal responsive means for controlling said stop means.

23. In a selector, a rotatable shaft, arms having a plurality of abutting surfaces arranged around said shaft, and a single means cooperable with said surfaces to determine the stop position of said shaft.

24. In a selector for stopping a rotatable shaft in any one of a plurality of character positions, a series of arms less in number than the number of character stop positions helically arranged around said shaft, each arm provided with a plurality of abutting surfaces, and means cooperable with said surfaces to determine the stop position of said shaft.

25. In a selector for stopping a rotatable shaft, a cylinder carried by said shaft having a helical series of arms each provided with a plurality of abutting surfaces, and means cooperable with said surfaces to determine the stop position of said shaft.

26. A selecting element comprising a series of spirally arranged stop arms each having an involute conformation and a plurality of progressively disposed abutments on each of said arms.

27. In a selector for stopping a rotatable shaft, a cylinder carried by said shaft comprising a series of spirally arranged stop arms each having an involute conformation and a plurality of progressively disposed abutments on each of said arms, and a coordinately positionable stop member cooperable with said abutments to determine the stop position of said shaft.

28. In a selector, an element comprising a series of spirally arranged stop arms each having an involute conformation and a plurality of progressively disposed abutments on each of said arms, and means cooperable with said abutments, said element and means movable relatively to each other to determine the stop position of said shaft.

29. In a selector for stopping a rotatable shaft, a cylinder carried by said shaft having a helical series of arms each provided with a plurality of abutting surfaces, and means cooperable with said surfaces, said means and said cylinder movable relatively to each other to determine the stop position of said shaft.

30. In a selector, a rotatable shaft, arms having a plurality of abutting surfaces arranged around said shaft, and a coordinately positionable means cooperable with said surfaces to determine the stop position of said shaft.

31. In a selector, a rotatable shaft arrestable in any one of a plurality of character stop positions, a cylinder carried by said shaft having a helical series of arms less in number than the number of character stop positions, each provided with a number of steps, a coordinately positionable stop member for arresting said shaft, and means to control the coordinate positionment of said member to establish the cooperative relationship between said member and said steps to determine the stop position of said shaft.

32. In a selector for stopping a rotatable shaft, a cylinder carried by said shaft having a helical series of arms each provided with a number of steps, and a coordinately positionable stop member adapted to cooperate with said steps to determine the stop position of said shaft.

33. In a printing telegraph receiver, a rotatable type wheel provided with a plurality of characters, a member having a helical series of arms less in number than the number of characters on said type wheel for controlling the rotation thereof, stop means cooperable with said arms for controlling said member, and a signal responsive means for controlling said stop means.

34. In a selector, a rotatable shaft, a series of arms helically arranged around said shaft, each arm provided with a plurality of abutting surfaces, and means cooperable with said surfaces to determine the stop position of said shaft.

35. In a selector for stopping a rotatable shaft in any one of a plurality of character positions, a series of arms less in number than the number of character stop positions helically arranged around said shaft, each arm provided with a plurality of abutting surfaces, and means cooperable with said surfaces to determine the stop position of said shaft.

36. In a selector for stopping a rotatable shaft, a cylinder carried by said shaft having a helical series of arms each provided with a plurality of abutting surfaces, and means cooperable with said surfaces to determine the stop position of said shaft.

37. A selecting element comprising a series of spirally arranged stop arms each having an involute conformation and a plurality of progressively disposed abutments on each of said arms.

38. In a selector for stopping a rotatable shaft, a cylinder carried by said shaft comprising a series of spirally arranged stop arms each having an involute conformation and a plurality of progressively disposed abutments on each of said arms, and a coordinately positionable stop member cooperable with said abutments to determine the stop position of said shaft.

39. In a printing telegraph receiver, a rotatable type wheel, a member having a helical series of serrated arms for controlling the rotation thereof, a stop element cooperable with said arms for controlling said member, and a signal responsive means for controlling said stop element.

40. In a printing telegraph receiver, a rotatable type wheel, a member having a helical series of arms for controlling the rotation thereof, said arms having a plurality of serrations on their respective functional edges, a stop element cooperable with said serrations for controlling said member, and a signal responsive means for controlling said stop element.

41. In a printing telegraph receiver, a rotatable type wheel provided with a plurality of characters, a member having a series of arms less in number than the number of characters on said type wheel for controlling the rotation thereof, said arms having a plurality of serrations on their functional edges, stop means cooperable with said serrations for controlling said member, and a signal responsive means for controlling said stop means.

42. In a printing telegraph receiver, a rotatable type wheel, a member having a helical series of arms for controlling the rotation thereof, said arms having a plurality of serrations on their respective functional edges, stop means cooperable with said serrations for controlling said member, and a signal responsive means for controlling said stop means.

43. In a telegraph receiver, a rotatable type wheel provided with a plurality of characters, means having a series of elements less in number than the number of characters on said type wheel and arranged in a plurality of planes for controlling the rotation thereof, stop means cooperable with said elements for controlling said means, and a signal responsive means for controlling said stop means.

ALBERT H. REIBER.